(12) United States Patent
Park et al.

(10) Patent No.: US 7,703,972 B2
(45) Date of Patent: Apr. 27, 2010

(54) BACK LIGHT UNIT

(75) Inventors: So Yeon Park, Seoul (KR); Jong Myoung Park, Seoul (KR); Sung Chul Shin, Seoul (KR); Young Woon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 196 days.

(21) Appl. No.: 11/937,190

(22) Filed: Nov. 8, 2007

(65) Prior Publication Data

US 2008/0158906 A1 Jul. 3, 2008

(30) Foreign Application Priority Data

Nov. 9, 2006 (KR) .................. 10-2006-0110294

(51) Int. Cl.
*F21V 7/04* (2006.01)
*F21V 7/22* (2006.01)

(52) U.S. Cl. .................. 362/613; 362/611; 362/606; 362/259; 349/64; 359/3

(58) Field of Classification Search ......... 362/600–634, 362/259; 349/60–64; 359/3
See application file for complete search history.

(56) References Cited

U.S. PATENT DOCUMENTS

| 5,471,327 | A  | * | 11/1995 | Tedesco et al. | 359/15 |
| 6,352,350 | B1 | * | 3/2002 | Ma | 362/19 |
| 6,637,905 | B1 | * | 10/2003 | Ng et al. | 362/601 |
| 7,481,562 | B2 | * | 1/2009 | Chua et al. | 362/612 |
| 2007/0201246 | A1 | * | 8/2007 | Yeo et al. | 362/627 |

* cited by examiner

*Primary Examiner*—Stephen F Husar
*Assistant Examiner*—James W Cranson
(74) *Attorney, Agent, or Firm*—Birch, Stewart, Kolasch & Birch, LLP

(57) ABSTRACT

A back light unit is disclosed. The back light unit includes a laser light source having a superior system organization efficiency and color reproducibility, and achieves uniform illumination by diffusing laser beams onto a light guide panel.

4 Claims, 6 Drawing Sheets

BACK LIGHT UNIT

This application claims the benefit of the Korean Patent Application No. 10-2006-0110294 filed on Nov. 9, 2006, which is hereby incorporated by reference as if fully set forth herein.

BACKGROUND OF THE INVENTION

1. Field of the Invention

The present invention relates to a back light unit, and more particularly, to a back light unit for a display apparatus.

2. Discussion of the Related Art

A liquid crystal display (hereinafter, shortly referred to as "LCD") apparatus is configured to adjust a brightness and darkness by changing the arrangement of liquid crystals introduced into a liquid crystal panel, and to display an image as light beams penetrate the adjusted bright and dark regions.

However, since the liquid crystal panel has no self-illumination function, the LCD includes a back light unit (BLU) to provide a rear surface of the liquid crystal panel with light beams.

The BLU includes a light source, a light guide panel, a reflector sheet, first and second diffuser sheets, and first and second prism sheets.

The light source is a device to generate light beams. A light emitting diode (LED), a cold cathode fluorescence lamp (CCFL), and a laser light source are mainly used as the light source.

The light guide panel uniformly transmits the light beams, generated from the light source, up to an upper surface thereof.

The reflector sheet reflects light beams, which proceeded to a lower surface and a side surface of the light guide panel, to the upper surface of the light guide panel.

The first diffuser sheet diffuses the light beams having passed through the light guide panel.

The first and second prism sheets adjust the proceeding direction of the light beams diffused from the first diffuser sheet.

The second diffuser sheet diffuses the light beams having passed through the first and second prism sheets, to introduce the light beams into the liquid crystal panel.

In the above described back light unit, however, there is a problem in that, when a LED or CCFL is used as the light source, the resulting BLU has an increased volume or deteriorated color reproducibility.

Further, when a laser light source is used as the light source, although the BLU has a superior system organization efficiency or color reproducibility, it is difficult to achieve uniform illumination due to a small radiation angle.

SUMMARY OF THE INVENTION

Accordingly, the present invention is directed to a back light unit that substantially obviates one or more problems due to limitations and disadvantages of the related art.

An object of the present invention is to provide a back light unit, which includes a laser light source having a superior system organization efficiency and color reproducibility, and can achieve uniform illumination by diffusing laser beams onto a light guide panel.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a back light unit comprises: a laser light source to generate laser beams; a light guide panel to uniformly transmit the laser beams to a liquid crystal panel; and a diffuser to uniformly diffuse the laser beams onto the light guide panel.

In this case, the laser light source may be located at a side of the light guide panel. The light guide panel may comprise a reflector pattern formed therein to uniformly transmit the laser beams. The diffuser may uniformly diffuse the laser beams onto the reflector pattern of the light guide panel. The diffuser may be attached to a laser beam emission surface of the laser light source. The diffuser may be attached to a laser beam incidence surface of the light guide panel. The diffuser may be located between a laser beam emission surface of the laser light source and a laser beam incidence surface of the light guide panel. The diffuser may be a holographic diffuser. In this case, the holographic diffuser may have a sheet shape. The diffuser may be a micro lens array. A thickness of the light guide panel may decrease far away from the laser light source. In this case, the light guide panel may have an inclined lower surface.

In accordance with another aspect of the present invention, there is provided a back light unit comprising: a light guide panel having a reflector pattern to uniformly transmit incident laser beams to a liquid crystal panel; a first laser light source provided at one side of the light guide panel to emit laser beams onto the reflector pattern; a second laser light source provided at the other side of the light guide panel to emit laser beams onto the reflector pattern; a first diffuser located between the first laser light source and the light guide panel, to uniformly diffuse the laser beams, to be introduced into a surface of the light guide panel, onto the reflector pattern; and a second diffuser located between the second laser light source and the light guide panel, to uniformly diffuse the laser beams, to be introduced into a surface of the light guide panel, onto the reflector pattern.

In accordance with yet another aspect of the present invention, there is provided a back light unit comprising: a laser light source to generate laser beams; a light guide panel to uniformly transmit the laser beams to a liquid crystal panel; and a holographic diffuser to uniformly diffuse the laser beams onto the light guide panel.

Examples of a display apparatus, which will be described hereinafter, may include a plasma display panel (PDP), a liquid crystal display, a projection TV, a projector, and other apparatuses to display an image on a screen.

However, for the sake of a more clear and detailed explanation of preferred embodiments of the present invention, the display apparatus according to the present invention will be described under the assumption of a liquid crystal display apparatus. Of course, it will be appreciated that the present invention is not limited thereto.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
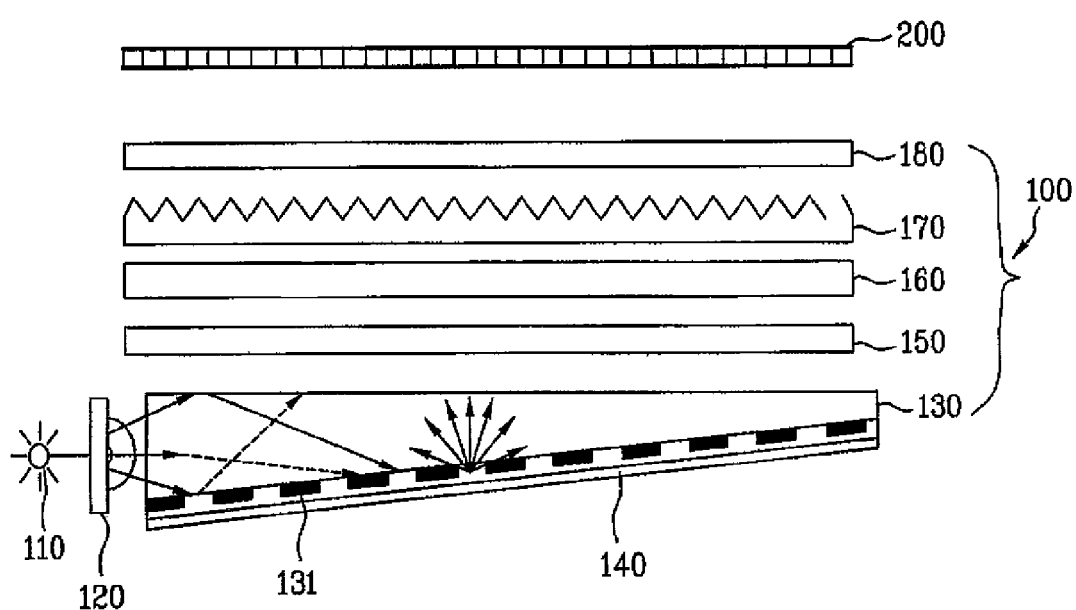
FIG. 1 is a configuration view illustrating a liquid crystal display according to an embodiment of the present invention.

FIG. 1 is a configuration view illustrating a liquid crystal display according to an embodiment of the present invention.

As shown in FIG. 1, the liquid crystal display apparatus according to the present invention includes a back light unit (hereinafter, shortly referred to as "BLU") 100, and a liquid crystal panel 200.

The BLU 100 includes a laser light source 110, a holographic diffuser 120, a light guide panel 130, first and second diffuser sheets 150 and 180, and first and second prism sheets 160 and 170.

It should be noted that two or more ones of the above constituent elements may be combined to constitute a single element, or any one of the constituent elements may be divided into two or more elements, if necessary in actual applications.

Hereinafter, the above mentioned constituent elements of the BLU will be described in detail.

The laser light source 110 generates laser beams, to emit the laser beams onto the light guide panel 130 through the holographic diffuser 120.

In this case, the laser light source 110 may be located at a side of the light guide panel 130.

Differently from a conventional lamp or LED having a wing type or lambertian type beam-radiation manner, the laser light source 110 has a small beam radiation angle, and consequently, has a high system organization efficiency and assures easy organization thereof. Further, the laser light source 110 has superior color coordinates, and can realize a color reproducibility higher by about 20% than a system using a LED, etc.

The holographic diffuser 120 uniformly diffuses the laser beams, emitted from the laser light source 110, onto a reflector pattern 131 included in the light guide panel 130.

In this case, the holographic diffuser 120 may be attached to a laser beam emission surface of the laser light source 110, or may be attached to a laser beam incidence surface of the light guide panel 130, so as to be integrally formed with the laser light source 110 or the light guide panel 130.

Alternatively, the holographic diffuser 120 may be located between the laser beam emission surface of the laser light source 110 and the laser beam incidence surface of the light guide panel 130.

The light guide panel 130 uniformly transmits the laser beams, diffused through the holographic diffuser 120, toward the liquid crystal panel 200.

The reflector sheet 140 is located below the light guide panel 130, to reflect laser beams, which proceeded to a lower surface and a side surface of the light guide panel 130, toward the liquid crystal panel 200.

The first diffuser sheet 150 diffuses the laser beams, having passed through the light guide panel 130, up to an upper surface thereof.

The first and second prism sheets 160 and 170 adjust the proceeding direction of the laser beams having passed through the first diffuser sheet 150.

The second diffuser sheet 180 diffuses the laser beams, having passed through the first and second prism sheets 160 and 170, to the liquid crystal panel 200.

The lower surface of the light guide panel 130 is inclined, and the light guide panel 130 has a horizontal emission surface, and an incidence surface perpendicular to the emission surface. The reflector sheet 140 is installed along the inclined lower surface of the light guide panel 130, to face the light guide panel 130.

With the above described arrangement, if light beams are incident on the reflector sheet 140 through the lower surface of the light guide panel 130, the reflector sheet 140 reflects and returns the laser beams to the light guide panel 130, thereby serving to reduce an optical loss.

If the laser beams are introduced into the light guide panel 130, the introduced laser beams are reflected by the reflector pattern 131 formed in the lower surface of the light guide panel 130, to thereby uniformly proceed to the emission surface of the light guide panel 130.

In this case, laser beams, which proceeded to the lower surface and the side surface of the light guide panel 130, are reflected by the reflector sheet 140, to thereby proceed to the emission surface of the light guide panel 130.

After being emitted from the light guide panel 130 through the emission surface of the light guide panel 130, the laser beams are uniformly diffused in all directions by the first diffuser sheet 150.

Meanwhile, it is known that the increased optical efficiency can be accomplished when laser beams are incident on the liquid crystal panel 200 in a direction perpendicular to the liquid crystal panel 200. For this, it is preferable to stack the plurality of first and second prism sheets 160 and 170 one above another, to adjust the proceeding angle of the laser beams emitted from the light guide panel 130 such that the laser beams proceed in a direction perpendicular to the liquid crystal panel 200. The first and second prism sheets 160 and 170 may have a convex and concave shape.

The first and second prism sheets 160 and 170 are arranged such that their prism arrangement directions are perpendicular to each other.

In brief, the first and second prism sheets 160 and 170 having the above described configuration serve to change the proceeding path of laser beams such that the laser beams, emitted from the light guide panel 130 below thereof, are incident on the liquid crystal panel 200 above thereof in a direction perpendicular to the liquid crystal panel 200.

The second diffuser sheet 180 secondarily diffuses the laser beams having passed through the first and second prism sheets 160 and 170.

The liquid crystal panel 200 forms an image by selectively transmitting or intercepting the laser beams diffused from the second diffuser sheet 180. More specifically, the liquid crystal panel 200 displays an image as liquid crystals are driven by a voltage difference between common electrodes provided at an upper substrate (not shown) of the liquid crystal panel 200 and pixel electrodes provided at a lower substrate (not shown) of the liquid crystal panel 200.

Figure 2:
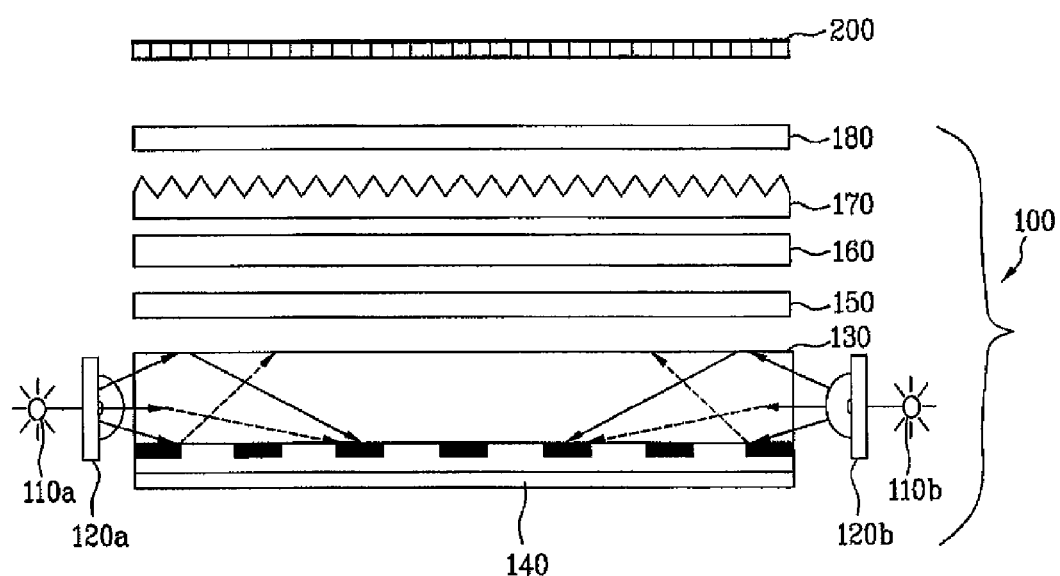
FIG. 2 is a configuration view illustrating a liquid crystal display according to another embodiment of the present invention.

Referring to FIG. 2, according to another embodiment of the present invention, the back light unit 100 may include a plurality of first and second laser light sources 110a and 110b, and a plurality of first and second holographic diffusers 120a and 120b.

Specifically, the first and second laser light sources 110a and 110b are provided at both sides of the light guide panel 130, respectively.

The first holographic diffuser 120a may be attached to a laser beam emission surface of the first laser light source 110a, or may be attached to a laser beam incidence surface of the light guide panel 130, so as to be integrally formed with the first laser light source 110a or the light guide panel 130.

Alternatively, the first holographic diffuser 120a may be located between the laser beam emission surface of the first laser light source 110a and the laser beam incidence surface of the light guide panel 130.

Also, the second holographic diffuser 120b may be attached to a laser beam emission surface of the second laser light source 110b, or may be attached to a laser beam incidence surface of the light guide panel 130, so as to be integrally formed with the second laser light source 110b or the light guide panel 130.

Alternatively, the second holographic diffuser 120b may be located between the laser beam emission surface of the second laser light source 110b and the laser beam incidence surface of the light guide panel 130.

When the plurality of first and second laser light sources 110a and 110b and the plurality of first and second holographic diffusers 120a and 120b are provided as described above, the light guide panel 130 may have a rectangular shape, and may have the inclined lower surface and the horizontal emission surface as shown in FIG. 1.

When the laser light source is used in a conventional BLU, as described above, the laser light source has a small radiation angle and thus, is difficult to achieve uniform illumination. To solve this problem, the present invention employs the holographic diffuser 120.

Specifically, with the use of the holographic diffuser 120, the laser beams, emitted from the laser light source 110, can be uniformly diffused or dispersed onto the reflector pattern 131 of the light guide panel 130.

Hereinafter, the holographic diffuser 120 according to the present invention will be described in detail.

Among various holography application fields, in particular, a holographic optical element (hereinafter, shortly referred to as "HOE") has been actively researched and developed. Currently, many conventional optical elements are being replaced by the HOE.

The HOE is an optical element devised to reproduce or deform hologram-recorded waveforms, so as to achieve desired waveforms.

Since the HOE is fabricated by recording an interference fringe pattern produced by a plurality of coherent beams, the resulting interference fringe pattern is uneven, and furthermore, the HOE has a diffraction grating structure having a generally well-defined fringe interval.

Accordingly, the HOE is a diffraction optical element to be operated by diffraction rather than reflection or refraction. The most representative diffraction element is a holographic diffraction grating.

Also, since the HOE is fabricated by recording an interference fringe pattern produced by a plurality of coherent beams, it is easy to fabricate a HOE having the nature of an aspheric lens.

The direction of a beam, diffracted by the HOE is determined by the fringe pattern on a surface of the HOE, whereas the diffraction efficiency of the diffracted beam is determined by the direction of a fringe and other internal fringe conditions such as and refraction, modulation, etc.

The HOE is classified into a plane type and a volume type.

The plane type diffracts an incident beam into several directions to thereby have a low efficiency, whereas the volume type diffracts an incident beam into only one direction to achieve a very high diffraction efficiency.

Also, the plane type has no great variation in diffraction efficiency when an incident angle varies, whereas the diffraction efficiency of the volume type varies greatly even by a slight variation of the incident angle, and thus, the volume type causes no diffraction phenomenon.

A holographic light shaping diffuser (hereinafter, shortly referred to as "LSD"), which is known as a light shaping homogenizer or simply as a diffuser, is of a type used in a variety of purposes such as illumination, imaging, light-projection applications, etc.

The LSD has a transparent or translucent configuration including an incidence surface, an emission surface, and light shaping structures formed at or in the incidence surface.

The light shaping structures are random, disordered non-planar micro-sculpted structures. The micro-sculpted structures act as miniature lenses to continuously and gently change the refractive index of a medium of the LSD.

The LSD may be fabricated to collect incident light beams, or to distribute the light beams over a circular area from a fraction of more than 100°, or may emit the light beams throughout a substantially infinite elliptical angular region. For example, when being illuminated by a laser light source, a LSD of 0.20°×50° produces a line, and a LSD of 35°×90° produces a narrow-field, high-resolution rear projection screen.

Two kinds of LSDs are currently available, namely a "volume LSD" and a "surface LSD".

The surface LSD is a surface relief holography element having a feature of integrating light shaping structures at a surface thereof.

The volume LSD is a volumetric holography element having a feature of integrating light shaping structures at a surface or within a body thereof.

Hereinafter, the manufacturing process of the holographic diffuser 120 according to the present invention will be described in detail with reference to FIGS. 3 to 5.

Figure 3:
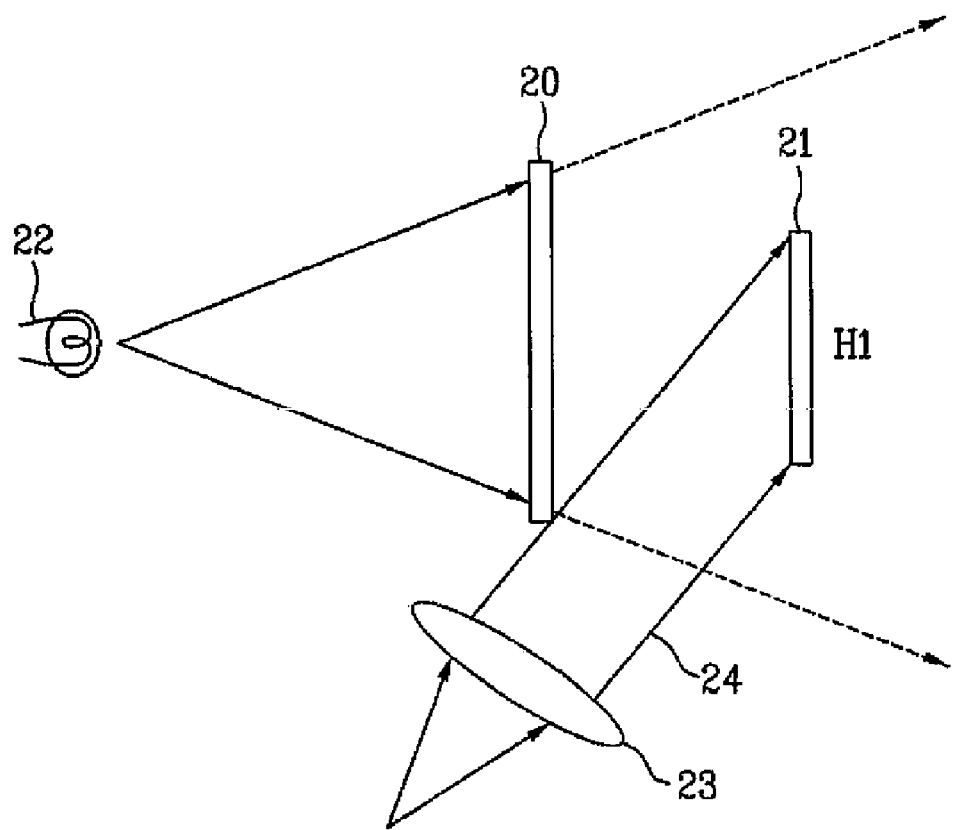
FIG. 3 is an explanatory view illustrating a first manufacturing operation of a holographic diffuser according to the present invention.

FIG. 3 is an explanatory view illustrating a first manufacturing operation of a holographic diffuser according to the present invention.

Figure 4:
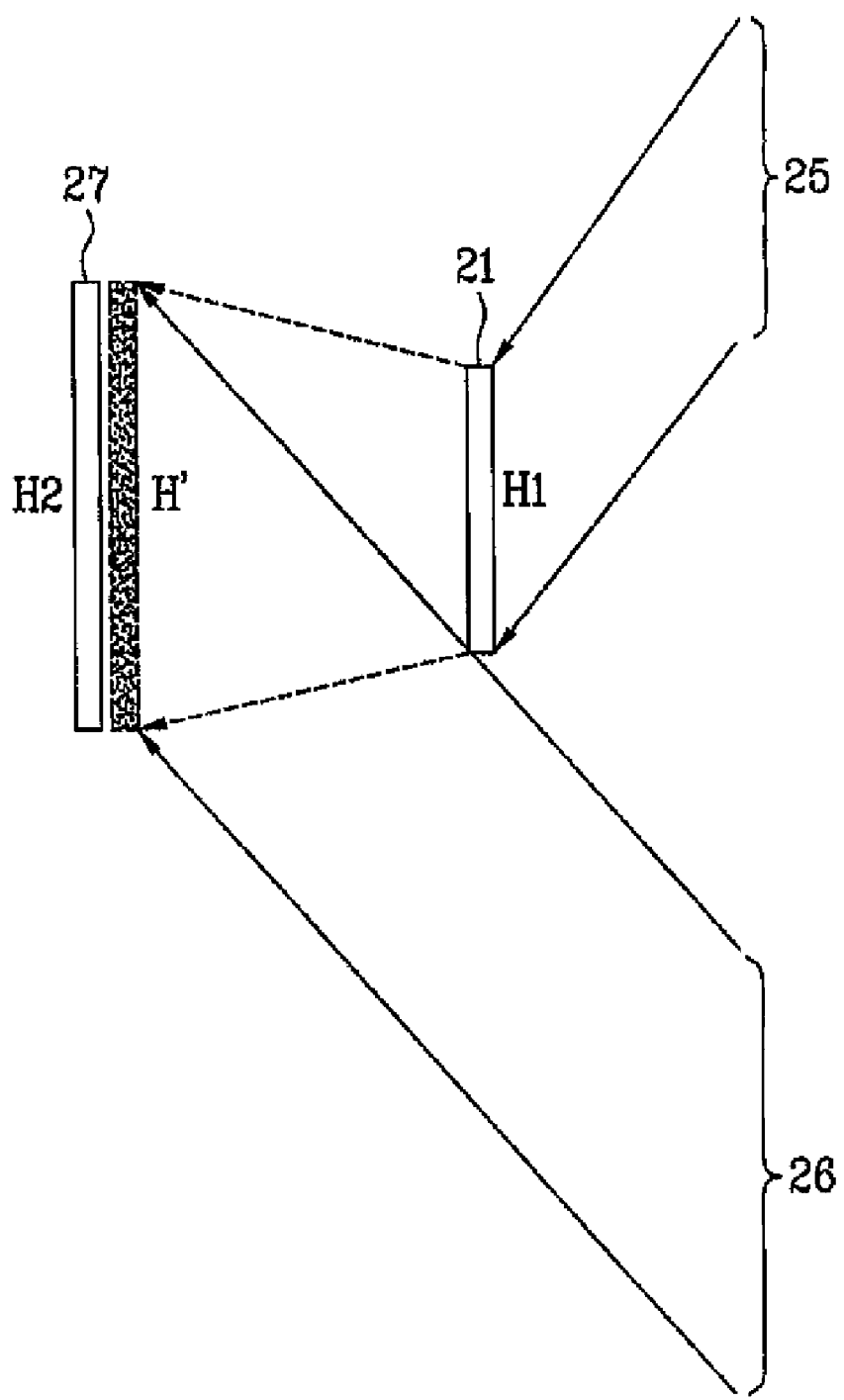
FIG. 4 is an explanatory view illustrating a second manufacturing operation of the holographic diffuser according to the present invention.

FIG. 4 is an explanatory view illustrating a second manufacturing operation of the holographic diffuser according to the present invention.

Figure 5:
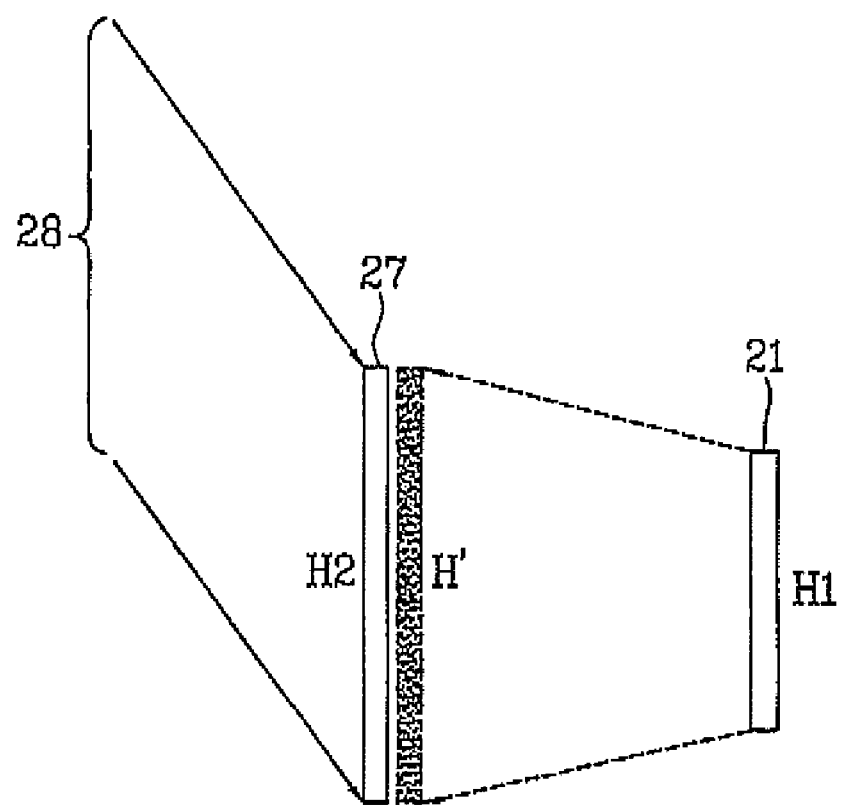
FIG. 5 is an explanatory view illustrating a third manufacturing operation of the holographic diffuser according to the present invention.

FIG. 5 is an explanatory view illustrating a third manufacturing operation of the holographic diffuser according to the present invention.

First, as shown in FIG. 3, a photosensitive film formed on a first photographic plate 21 is exposed to beams by use of a master diffuser 20 made of a monolithic glass. In this case, to record a uniform diffuser image on the first photographic plate 21, the master diffuser 20 having a larger size than that of the first photographic plate 21 is used.

In this case, to keep the size of an object at a constant value, first reference beams 24, which are made into parallel beams by a collimating lens 23, are introduced onto a surface of the first photographic plate 21.

After an interference fringe (hologram image) H1 is formed, by exposure, on the photosensitive film of the first photographic plate 21 by diffraction and interference of the first reference beams 24 and diffused beams, the exposed photosensitive film is developed. In the drawing, reference numeral 22 represents a laser light source.

Referring to FIG. 4, if first conjugated reference beams 25 are irradiated to the hologram image H1 recorded on the first photographic plate 21, a hologram image H' of the master diffuser 20 appears in a space.

Then, by targeting the hologram image H' as an object, a second photographic plate 27 is exposed to second reference beams 26, which were collimated into parallel beams.

In this case, the second reference beams 26 are incident on the second photographic plate 27 in a direction inclined by a predetermined angle. Thereby, an interference fringe (hologram image) H2 is recorded on a photosensitive film of the second photographic plate 27 by diffraction and interference.

Referring to FIG. 5, if second conjugated reference beams 28 are irradiated onto the second photographic plate 27 recorded with the hologram image H2, a real image of the hologram image H' is displayed in a space.

Generally, since a hologram has a high information density, it has a feature of completely reproducing the overall appearance of an object even if a predetermined part of the hologram is covered.

On the basis of the above described feature, if conjugated reference beams are again irradiated to the interference fringe H2, the real image of the hologram image H' can be seen completely even if a half of the second photographic plate 27 is covered.

If the interference fringe H2 is reproduced in this state, the second conjugated reference beams 28 are diffracted, thereby being converged onto the rear image of the hologram image H'.

In this case, by setting the interference fringe H2 to serve as a light diffuser, the HOE, required in the present invention, can be accomplished.

The above described manufacturing method of the holographic diffuser 120 is one of various manufacturing methods. Accordingly, it will be appreciated that the holographic diffuser 120 can be manufactured by various methods, in consideration of a radiation angle, diffusion degree, or process requirements.

Although the holographic diffuser 120 is mainly used to make uniform beams, it may be used to make a desired beam shape. When using a designed holographic sheet, the holographic diffuser 120 has a reduced thickness, resulting in an enhanced system organization efficiency and easy manufacturing.

Further, as a result of previously designing the holographic diffuser 120 to have a desired radiation angle, the holographic diffuser 120 can be designed easily to conform to a desired system, resulting in a high-efficiency system.

The holographic diffuser 120 may be a plate-shaped individual element, or may be a sheet attachable to a surface of a light source or light guide panel when in use.

It will be appreciated that the above described holographic diffuser 120 may be replaced by a general plastic diffuser or other optical elements such as a prism sheet and a micro-lens-array (MLA).

By increasing the radiation angle of a laser beam using the above described optical element prior to introducing the laser beam onto the surface of the light guide panel 130, the uniformity of illumination light can be enhanced.

Herein, a micro-lens denotes a very fine lens having a size of several millimeters or less. A micro-lens-array (MLA) is formed by arranging a plurality of micro-lenses one-dimensionally or two-dimensionally. In addition to the micro-lens-array, a lenticular lens sheet formed by arranging a plurality of micro-lenses may be used as a diffuser.

Figure 6:
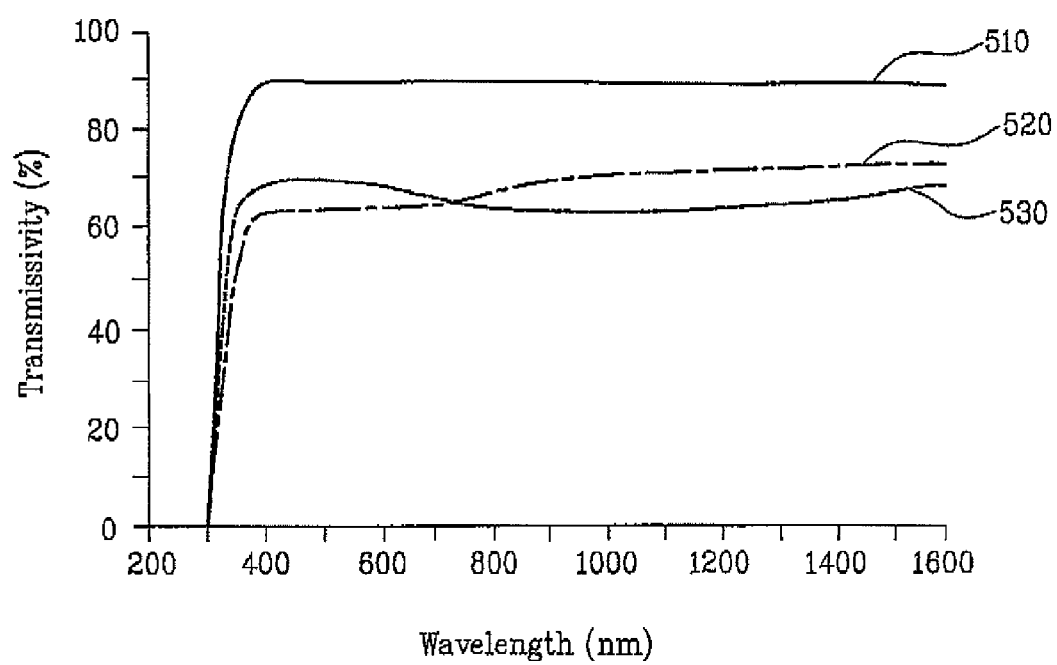
FIG. 6 is a graph comparing the transmissivity of the holographic diffuser according to the present invention with the transmissivity of a conventional diffuser.

FIG. 6 is a graph comparing the transmissivity of the holographic diffuser according to the present invention with the transmissivity of a conventional diffuser.

It can be appreciated from FIG. 6 that a transmissivity 510 of the holographic diffuser according to the present invention is greatly higher than a transmissivity 520 of a plastic diffuser and a transmissivity 530 of a general ground glass.

As apparent from the above description, the back light unit 100 according to the present invention includes a laser light source having a superior system organization efficiency and color reproducibility, and has the effect of diffusing laser beams onto a light guide panel and consequently, providing uniform illumination.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A back light unit comprising:
   a first and a second laser light source to generate laser beams;
   a light guide panel located between the first and the second laser light sources and configured to uniformly transmit the laser beams to a liquid crystal panel; and
   a first and a second holographic diffuser configured to uniformly diffuse the laser beams onto the light guide panel,
   wherein the first holographic diffuser is attached to a laser beam emission surface of the first laser light source and is a space away from a first laser beam incidence surface of the light guide panel,
   wherein the second holographic diffuser is attached to a laser beam emission surface of the second laser light source and is a space away from a second laser beam incidence surface of the light guide panel, and
   wherein the first and the second holographic diffusers are photographic plates having a respective hologram image, each respective hologram image being recorded on a photosensitive film of the respective photographic plate.

2. The back light unit according to claim 1, wherein the first and the second laser light sources are located at two sides of the light guide panel.

3. The back light unit according to claim 1, wherein the light guide panel comprises a reflector pattern formed therein to uniformly transmit the laser beams.

4. The back light unit according to claim 3, wherein the first and the second holographic diffusers are configured to uniformly diffuse the laser beams onto the reflector pattern of the light guide panel.

* * * * *